(12) United States Patent
Curry

(10) Patent No.: US 7,412,511 B2
(45) Date of Patent: Aug. 12, 2008

(54) METHOD AND SYSTEM FOR PROVIDING ON-LINE WELLNESS AND RETAIL ACCESS THROUGH A DISTRIBUTED NETWORK

(76) Inventor: James Prescott Curry, 201 Ocean Bluff's Blvd., Jupiter, FL (US) 20231

( * ) Notice: Subject to any disclaimer, the term of this patent is extended or adjusted under 35 U.S.C. 154(b) by 1188 days.

(21) Appl. No.: 09/449,237

(22) Filed: Nov. 24, 1999

(65) Prior Publication Data

US 2002/0059359 A1 May 16, 2002

Related U.S. Application Data

(60) Provisional application No. 60/118,262, filed on Feb. 2, 1999.

(51) Int. Cl.
*G06F 15/16* (2006.01)
*G06F 15/173* (2006.01)
(52) U.S. Cl. .................. 709/225; 709/219
(58) Field of Classification Search .......... 713/201; 709/203, 219, 229, 228; 705/16, 26, 93; 235/379, 380; 482/8.9, 198
See application file for complete search history.

(56) References Cited

U.S. PATENT DOCUMENTS 5,678,041 A * 10/1997 Baker et al. ................ 707/9

(Continued)

FOREIGN PATENT DOCUMENTS

| WO | WO 97/50046 | 12/1997 |
| WO | WO 98/57247 | 12/1998 |
| WO | WO 99/03045 | 1/1999 |

OTHER PUBLICATIONS

Cole-Gomolski, "Groupware gives lift to Reebok site", Computerworld, Framingham, Jan. 19, 1998, vol. 32, Issue 3, pp. 49-50.*

(Continued)

*Primary Examiner*—Glenton B. Burgess
*Assistant Examiner*—Aaron Strange
(74) *Attorney, Agent, or Firm*—Craig Taylor Law Office, PLLC

(57) ABSTRACT

The invention provides a method and a system that allow users to purchase goods and health-related services over a distributed network, like the Internet. Using a portal or a buyer interface, a user connects to a controller or server through a distributed network either directly or via a service provider. When the user connects to the controller, the controller initiates a validation sequence to identify the portal and the user. When the portal and the user are identified, the controller assigns an access code that defines the user's access rights to the controller. The user can then access fitness, nutrition, and wellness information or purchase goods from the controller, which in one embodiment emulates a web site, or provide access to other linked sites. In addition, the method and system provides users with opportunities to engage in on-line conversations with fitness instructors, coaches, doctors, and others that may be on-line. Moreover, the method and system categorizes users within control groups and develops user improvement plans for improving the users' fitness, nutrition, and/or wellness. The improvement plans, which are based on practical guidelines and advice, are periodically updated by the method and system if the plans are not consistent with the previous expectations. Furthermore, the users are recategorized if the user fails to meet his or her plan.

12 Claims, 8 Drawing Sheets

U.S. PATENT DOCUMENTS

| | | | | |
|---|---|---|---|---|
| 5,708,780 | A * | 1/1998 | Levergood et al. | 709/229 |
| 5,794,207 | A | 8/1998 | Walker et al. | |
| 5,797,127 | A | 8/1998 | Walker et al. | |
| 5,870,724 | A * | 2/1999 | Lawlor et al. | 705/42 |
| 5,890,997 | A * | 4/1999 | Roth | 482/8 |
| 5,911,687 | A * | 6/1999 | Sato et al. | 600/300 |
| 5,915,246 | A * | 6/1999 | Patterson et al. | 705/43 |
| 5,916,063 | A * | 6/1999 | Alessandri | 482/1 |
| 5,954,640 | A | 9/1999 | Szabo | |
| 5,970,475 | A * | 10/1999 | Barnes et al. | 705/27 |
| 6,003,019 | A * | 12/1999 | Eaton et al. | 705/42 |
| 6,027,428 | A * | 2/2000 | Thomas et al. | 482/4 |
| 6,047,268 | A * | 4/2000 | Bartoli et al. | 705/35 |
| 6,050,924 | A * | 4/2000 | Shea | 482/57 |
| 6,053,844 | A * | 4/2000 | Clem | 482/1 |
| 6,112,224 | A * | 8/2000 | Peifer et al. | 340/3.1 |
| 6,159,131 | A * | 12/2000 | Pfeffer | 482/8 |
| 6,269,339 | B1 * | 7/2001 | Silver | 705/2 |
| 6,330,491 | B1 * | 12/2001 | Lion | 700/237 |
| 6,349,337 | B1 * | 2/2002 | Parsons, Jr. et al. | 709/227 |

OTHER PUBLICATIONS

Britt, "The ATM connection", Savings & Community Banker, Washington, Sep. 1994, vol. 3, Issue 9.*

Business Wire, "Myriad of New Ad Deals for Netpulse; Sponsors Drawn to Captive Audience of Fitness Center Members", Business Wire, New York, Nov. 1, 1999, p. 1.*

West, "Online opportuhnities: AFAA's TeleFitness Center provides now features and services for AFAA members", American Fitness, Sherman Oaks, Jan./Feb. 1999, vol. 17, Issue 1, p. 56.*

Anonymous, "Internet update", American Fitness, Sherman Oaks, Nov./Dec. 1996, vol. 14, Issue 6, p. 13.*

West, "Fitness at your fintertips", American Fitness, Sherman Oaks, Nov./Dec. 1998, vol. 16, Issue 6, p. 17.*

PR Newswire, Concentric Network Powers Netpulse Fitness Machines in Clubs Across the Country, PR Newswire, New York, Sep. 9, 1998, p. 1.*

Schwinn Fitness Advisor System—The Future of Fitness—displayed at http://www.schwinn.com/99/news/fitpressl.html, 1998.

Sportlogic displayed Sportlogic displayed at http://www.karchinternational.com/en/products/kisoftware/sportlogic.html.

Fitnessage displayed at http://www.fitnessage.com/about.html.

Microfit—Software Programs displayed at http://www.microfit.com/software.html.

* cited by examiner

METHOD AND SYSTEM FOR PROVIDING ON-LINE WELLNESS AND RETAIL ACCESS THROUGH A DISTRIBUTED NETWORK

This application claims priority from U.S. Provisional Patent Application No. 60/118,262, filed Feb. 2, 1999, which is incorporated by reference herein.

BACKGROUND OF THE INVENTION

1. Technical Field of the Invention

The present invention relates to providing on-line customer access to wellness information and retail products through a distributed access network, and in particular, to a method and system that provides distributed access to fitness, nutrition, and wellness information and related products.

2. Description of the Related Art

Advances in distributed technology such as the Internet provide access to a wide range of information. Users can log onto distributed networks at any time and receive a wide range of information ranging from the news to commercial offers. Vast numbers of companies advertise and solicit sales on the Internet, creating a large domain of products and services that is not always accessible or easy to navigate.

A variety of wellness information is available on the Internet through web sites. Some sites are devoted to avoiding illness. These sites do not address improving the quality of life or provide personal exercise and nutrition counseling. Some sites are no more than Internet links. Like many other Internet sites, many wellness sites require a computer to access as well as the time to logon and navigate through all the vendor and commercial media.

SUMMARY OF THE INVENTION

The invention provides a method and a system that allows users to custom design interactive fitness, diet, and rehabilitation programs and purchase goods. The system and method includes at least one portal, a distributed network, and a controller or server. The portals are distributed to sponsors to provide distributed access to the controller. For example, a sponsored portal could be a kiosk placed in a health club, fitness center or shopping mall. An authorized non-sponsored portal could be an authorized user's home computer.

In operation, when a user connects to the controller, the controller initiates a validation sequence. The controller seamlessly accesses a record system or a database to identify the portal and the user. When the portal and the user are identified, the controller assigns an access code. Preferably, the access code defines the user's access rights that determine the level of services and discounts offered to the user. While the access code is being assigned, the controller may transparently access a payment database or a payment controller that retains records of user accounts receivable. If the user is delinquent, the controller can prompt the user to tender payment. Payment may then be tendered, for example, through credit cards, electronic fund transfer, debit cards, digital cash, vending systems, or other known electronic commerce methods.

Upon completion of the credit and validation sequence, the controller may prompt the user to complete a registration process before permitting further access. Preferably, the registration process guides the user through interactive screens that pose questions to gather demographic and lifestyle information. The user may update the demographic and lifestyle information over time. At the user's direction, the controller assesses the relevant user information to evaluate the user's fitness, nutrition, and wellness profiles according to the user's access rights. The controller then offers practical guidelines and advice to improve the user's profiles. The practical guidelines and advice may be in the form of a user improvement plan. The system and method may further allow each user to update their fitness, nutrition, and wellness information over time from any location (e.g., home computer, health club, fitness center, etc.). When users update lifestyle information, the method and system retains a profile history that users can later access to monitor their program progress.

In one aspect, the controller continuously gathers and stores each user's fitness, nutrition, and wellness result data to update the profile history. Result data is user lifestyle information that includes, but is not limited to, data recorded either by the user or the system after the user performs a fitness, nutrition or wellness act (e.g., a workout, or repetition using a particular weight and machine). At the user's discretion, the controller assesses the relevant user information with the stored result data to evaluate the user's fitness, nutrition, and wellness profiles according to the user's access rights. The controller then offers practical guidelines and advice in the form of a user improvement plan, which is updated as the user continuously enters the result data.

In one preferred aspect, the user is compared to a control group of users. The user's control group is determined by the user demographic and lifestyle information, the user goals, and/or the user profiles. The practical guidelines and advice offered to improve the user's profiles (i.e., the user improvement plan) are similar to those provided to the other users within the control group. The practical guidelines and advice are based on models provided by fitness, nutrition, and/or wellness experts. The controller will continuously gather and store the user's fitness, nutrition and wellness information for each user and continuously gather and store each user's lifestyle information for the control group. The controller analyzes the control group lifestyle information and evaluates the control group's practical guidelines and advice. Moreover, the controller updates the practical guidelines and advice for the control group based on the stored group lifestyle information.

In addition to providing health services, the system and method preferably also offers goods for sale. Using the above-described validation and credit sequence, users view products, such as shoes or health supplements, for example, and place orders. A user that desires to purchase goods selects from the controller or linked sites and specifies the quantity of goods to be purchased. A confirmation string is then generated and communicated to the user. When an agreement is reached, the sale is logged to an order system or a database that track orders.

In one preferred aspect, the method and system are accessible to the user through non-sponsored and sponsored supported portals. A sponsored supported portal is known as a buyer interface. Preferably, the method and system differentiate buyer interfaces from non-sponsored or personal portal sites and adjusts users' access rights according to their locations. Preferably, a user's access code will reflect his or her location.

The disclosed method and system provides a simple and user-friendly interface that allows users to custom design interactive fitness, diet, and rehabilitation programs and purchase goods through the convenience of a distributed network. The method and system acquire and retain wellness information directed to eating properly and working out effectively that is easily accessible from many locations. The controller tracks user fitness, nutrition, and wellness profiles over time, creating opportunities for vendors to direct market to consumers' health, exercise, and eating profiles.

The method and system also provide users with opportunities to engage in on-line conversations with a diversity of fitness instructors, such as for example, personal trainers, coaches, and doctors. Moreover, the method and system can automatically modify the services and discounts offered to users based on user access locations.

These features as well as other advantages of the invention will become apparent upon consideration of the following detailed description and accompanying drawings of the presently preferred embodiments of the invention described below.

DETAILED DESCRIPTION

Figure 1:
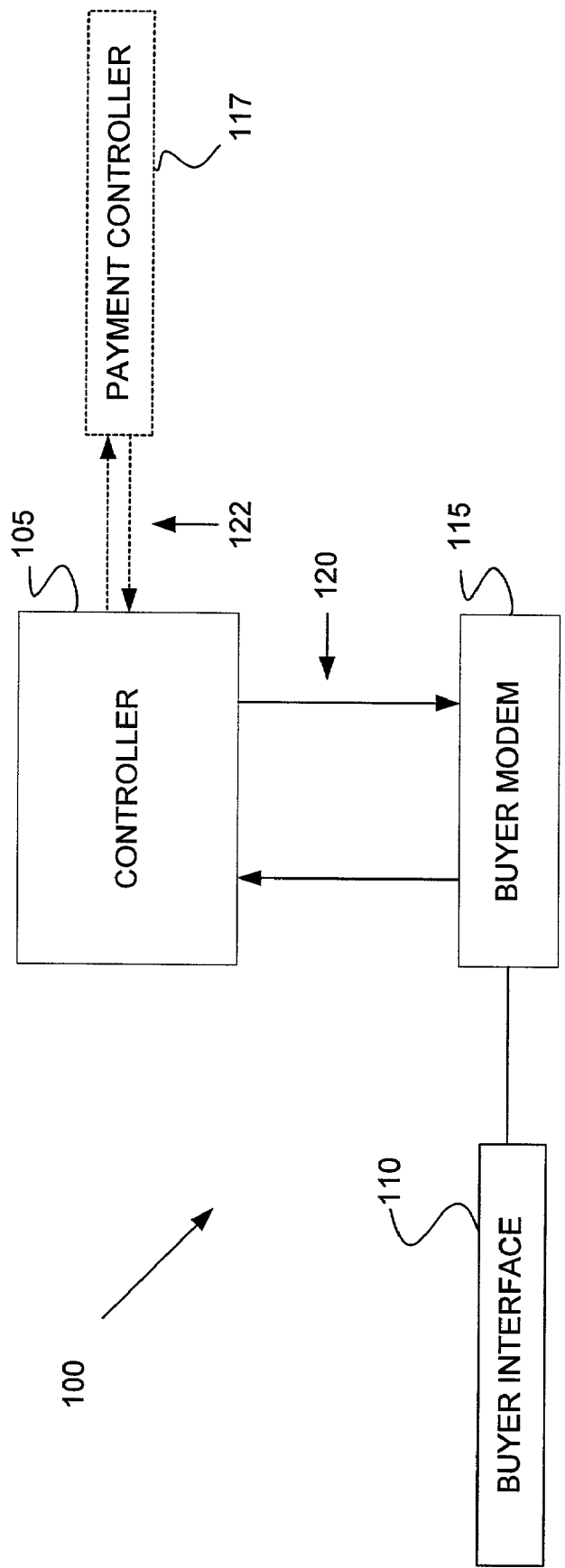
FIG. 1 is a block diagram of a first embodiment of the invention.

In the drawings the same reference numbers through several views designate similar elements.

1. System Structure

FIG. 1 illustrates the components of the system 100. Optional elements are represented by dashed boxes, which are for alternative embodiments of the system 100. The system 100 comprises a controller 105, a buyer interface 110, a buyer modem 115 and an optional payment controller 117. The controller 105 and the buyer modem 115 connect to a distributed network 120 such as the Internet in a manner well known to those skilled in the art. Communication may be provided, for example, through personal communication systems, microwaves, satellites, and/or through landlines.

As shown, the buyer modem 115, which is any device that converts data from one form to another, connects to the distributed network 120 and the buyer interface 110. The connections shown in FIG. 1 encompass both direct and indirect connections. For example, with reference to FIG. 1, the buyer modem 115 may connect to an intermediate device (not shown) that connects either directly, or via one or more additional components (not shown) to the buyer interface 110.

The buyer interface 110 connects users to the distributed network 120. Each buyer interface 110 is connected to a buyer modem 115 that communicates with the controller 105. Preferably, the system 100 comprises one or more buyer interfaces 110 and buyer modems 115 (collectively known as a "kiosks") that allow multiple users to interact with the controller 105.

The payment controller 117 is optional and is connected to the controller 105 via a second distributed network 122. The second distributed network 122 may be the same as the distributed network 120 connecting the buyer modem 115 and the controller 105 (e.g., the Internet), or may be a different connection (e.g., a direct phone line). Communication may be provided, for example, through personal communication systems, microwaves, satellites, and/or through landlines.

Figure 2:
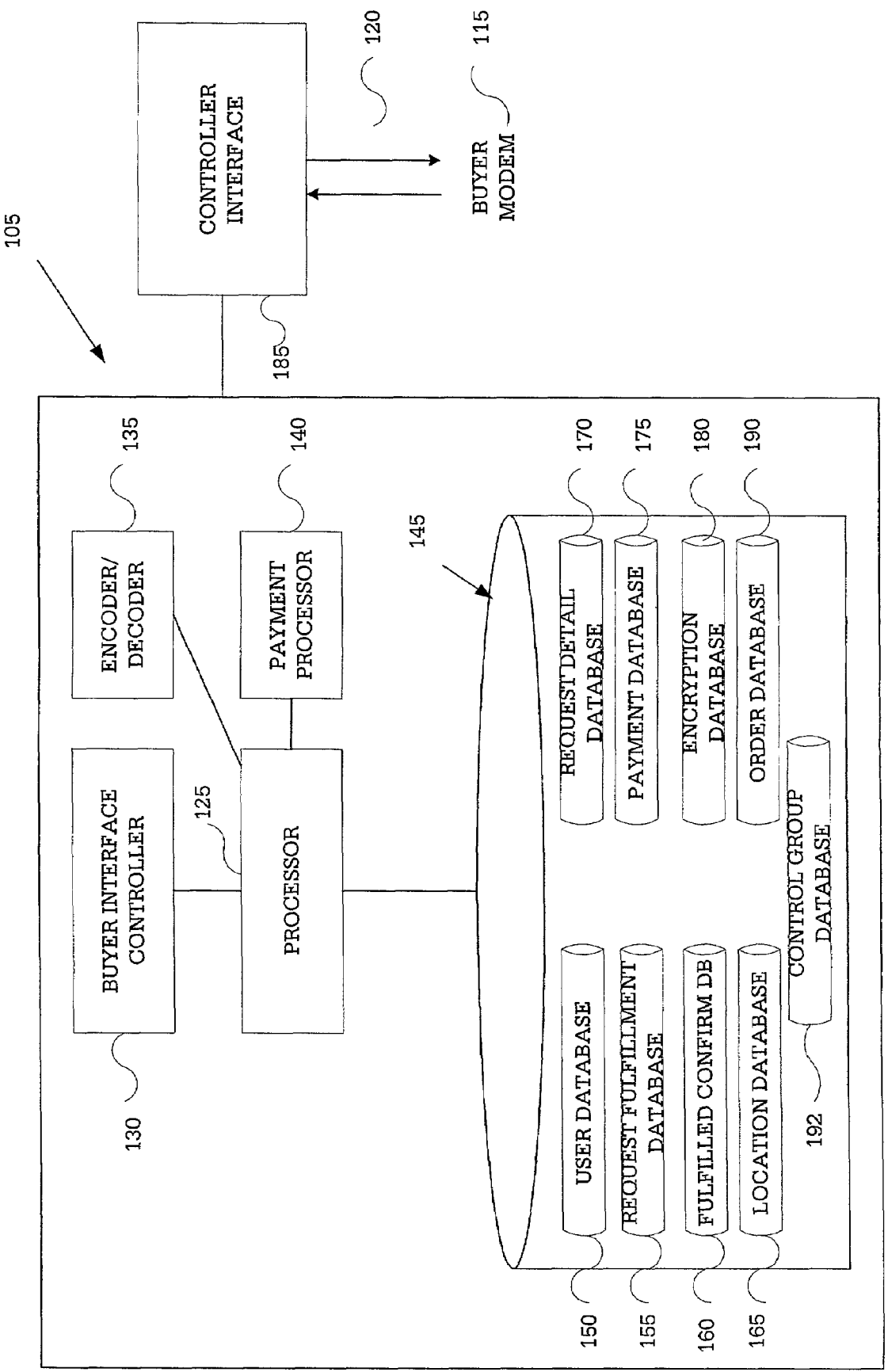
FIG. 2 is a block diagram of a controller of FIG. 1.

In the system 100, of FIG. 2, the controller 105 comprises a processor 125, a buyer interface controller 130, an encoder/decoder 135, a payment processor 140, and a storage device 145. The processor 125 operates as a server that responds to the buyer interface 110 (shown in FIG. 1). Preferably, the processor 125 comprises a microprocessor-based system having static and dynamic memory and runs on a known operating system. Here, an INTEL™ based computer employing a thirty-two-bit architecture running a WINDOWS™ operating system may be used. The system 100, may also employ other operating systems such as LINUX™ or those used on SUN™ workstations and APPLE™ machines, for example.

The buyer interface controller 130 supports buyer interface and user connections and their respective identification. The buyer interface controller 130 comprises one or more microprocessors or software modules that identify users and portal addresses.

The encoder/decoder 135 supports the ciphering and deciphering of communication between users and the controller 105. Preferably, the encoder/decoder 135 is a dedicated processor; however, the encoder/decoder 135 may be implemented through software modules as well.

The payment processor 140 processes payment transactions from the buyer interface 110 (FIG. 1). Like the encoder/decoder 135, the payment processor 140 may be implemented as a co-processor or through software modules. Preferably, the payment processor 140 interfaces to commercial and/or non-commercially available software that may accommodate on-line account statements, order-taking, automated sales tax calculations, electronic fund transfers, debit card payment authorizations, credit card payment authorizations, digital receipt creation, credit card settlements, vending payment systems, and/or other known electronic commerce methods. One site offering some of these services is AUTHORIZE.NET™ located at Internet address http://www.authorizenet.com. Alternatively, the payment processor 140 coordinates payment transactions from the buyer interface 110 with the payment controller 117.

The storage device 145 accommodates the information exchange between users and the system 100. Databases residing in the storage device 145 comprise a user database 150, an order database 190, a request detail database 170, a request fulfillment database 155, a fulfilled confirm database 160, a payment database 175, an encryption database 180, a location database 165, and a control group database 192.

The user database 150 maintains user information. Preferably, the user information comprises general demographic, lifestyle, and credit information. Information such as a user's name, address, social security number, weight, exercise routines, eating habits, credit rating, phone number(s), and/or e-mail addresses, for example, are maintained in the user database 150. User information is obtained when the user registers on the system 100 and can be updated by the user over time. In another aspect of the invention, the user database 150 contains data fields for continuously gathering and storing user's fitness, nutrition and wellness result data. Result data is user lifestyle information that includes, but is not limited to, data recorded either by the user or the system after the user performs a fitness, nutrition or wellness act (e.g., a weight trainer completing a workout). The user database 150 also stores access codes generated each time a user logs onto the system 100. Access codes define user access rights that determine the level of services and discounts the user can receive.

The order database 190 retains data on buyers and goods with records that track buyer's names, contact information, payment options, and an identification of goods sold. Contact information comprises a telephone number, street address, e-mail address, facsimile number, or other means to contact the buyer.

The control group database 192 contains group lifestyle information for at least one control group having a plurality of users. The group lifestyle information for the plurality of users correlates to the lifestyle information for each user in the user database 150. Preferably, the plurality of users in each control group have similar user demographic and lifestyle information, user goals, and/or user profiles.

The request detail database 170 maintains data or records on user goals and purchase requests. The data or records include fields that identify the program(s) of interest such as retail orders and fitness, diet, or rehabilitation programs, for example, user goal(s), and custom information. Custom information for an exemplary diet program might include age, gender, height, weight, and a description of the user's current physical condition.

The request fulfillment database 155 traces user requests logged to the request detail database 170. The request fulfillment database 155 analyzes user requests and provides purchase orders, health, wellness, and counseling in response to user queries. Moreover, if the user requests a user improvement plan, the request fulfillment database 155 preferably prepares the user requests based in part on the individual's control group. The request fulfillment database 155 includes a plurality of software modules that analyze order, fitness, diet, and rehabilitation data. The modules analyze the data based on models provided by expert fitness instructors, coaches, doctors and/or nutritionists.

The filled confirm database 160 maintains data on serviced responses. Preferably, the filled confirm database 160 tracks user identification strings, dates, time, and other identifiable strings that identify the user, services, and goods provided.

The payment database 175 confirms and tracks transactions. The payment database 175 maintains data on user credit status and accounts receivable that reflect services accessed and goods purchased. The user credit status and accounts receivable data can be obtained and stored by the controller 105 (shown in FIG. 1), and/or be received from the payment controller 117 (shown in FIG. 1). The database 175 stores user credit information with records tracking user identification strings, payment status, and credit and debit card information. In an alternative embodiment, the payment controller 117 can perform the functions of the payment database 175.

The encryption database 180 ensures secure encrypted network communication by storing both symmetric and asymmetric encryption keys. The encryption database 180 provides a repository and reference table to the encoder/decoder 135. The link between the encryption database 180 and encoder/decoder 135 allows the system 100 to manage electronic commerce in a real-time secure environment. The encryption database 180 also tracks purchase confirmation strings and user identification strings.

The location database 165 stores location data related to vendor sponsored access locations. Preferably, the location data includes portal addresses or other identifying means.

Finally, the controller interface 185 facilitates controller 105 access from the distributed network 120. Preferably, the controller interface 185 is a modem. Like the buyer modem 110, the controller interface 185 is any device that converts data from one form to another such as ISDN and DSL adapters, for example, that allows the controller 105 to communicate with peripheral devices. The controller interface 185 has a baud rate that corresponds to portal transfer rates. Preferably, the controller interface 185 conforms to the connection speed and connection protocol of each portal.

Various layouts are also envisioned in the system 100. Although only one buyer interface 110, one buyer modem 115, one controller 105, and one controller interface 185 are shown in FIG. 1, it is envisioned that multiple interfaces, modems, and controllers may be implemented in several locations. One alternative embodiment has the payment controller 117 being connected to the controller 105 via a second distributed network 122. The payment controller 117 may be a controller specified by the sponsor or a third party representing the sponsor. The payment controller may receive payment information from the controller 105. Moreover, it is envisioned that the system 100 may interface to multiple networks through any combination of links.

Figure 3:
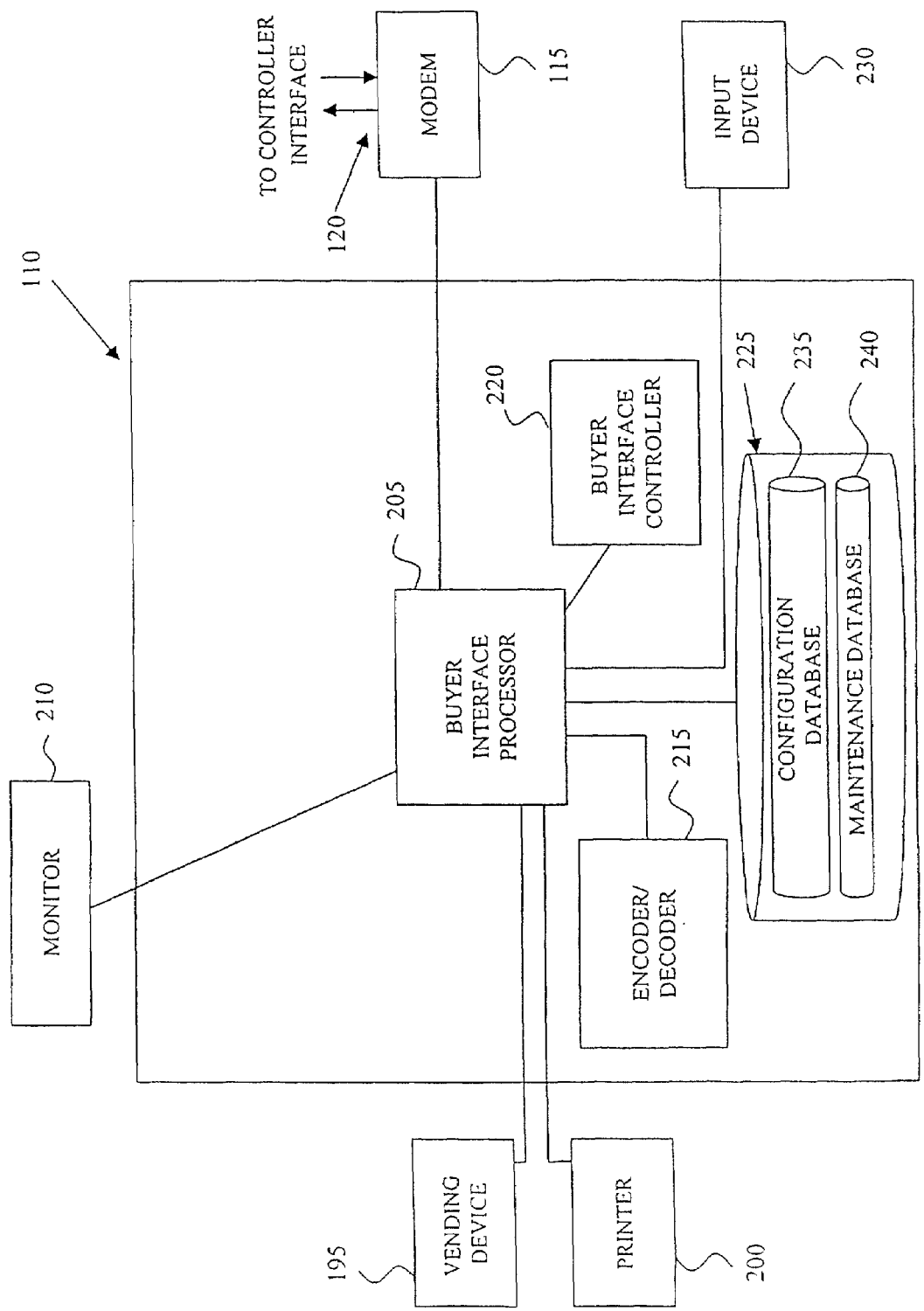
FIG. 3 is a block diagram of a buyer interface of FIG. 1.
Figure 4:
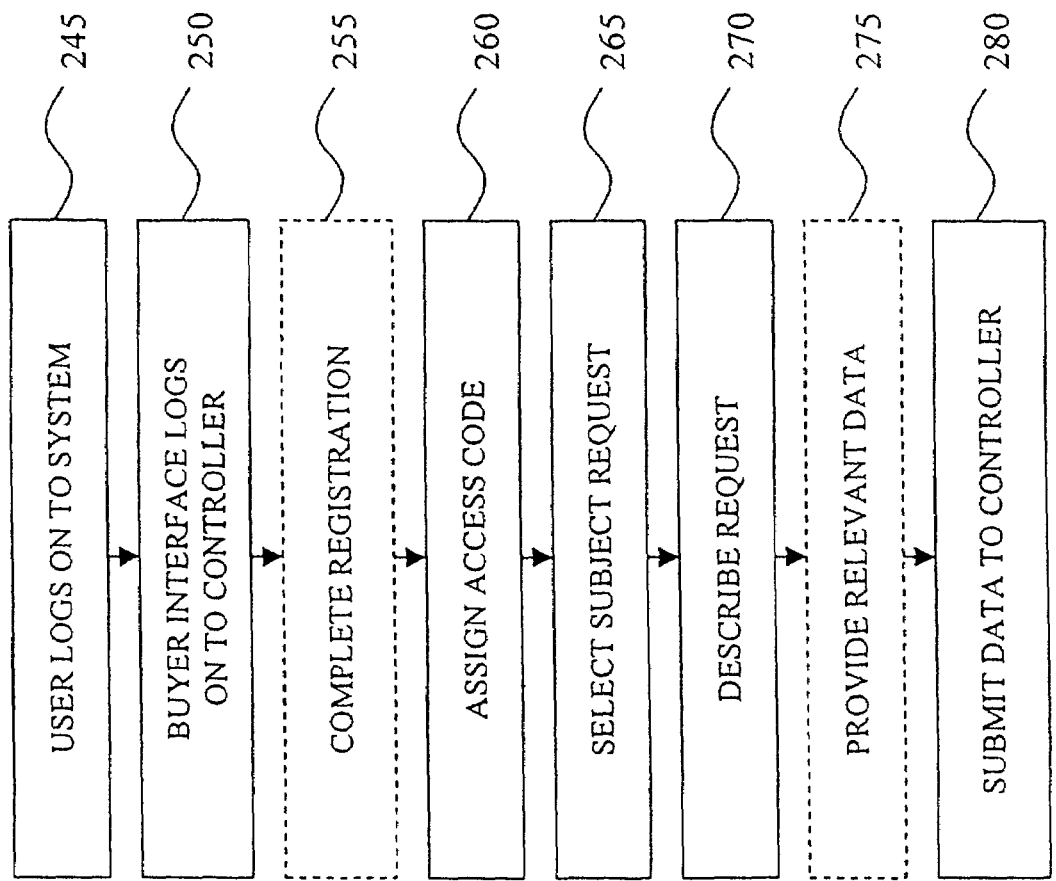
FIG. 4 is a flow-chart of a request for goods and/or services of FIG. 1.

FIG. 3 illustrates the buyer interface 110 in greater detail. The buyer interface comprises a vending device 195, a printer 200, a monitor 210, an input device 230; and a buyer interface 110 comprising a processor 205, an encoder/decoder 215, a controller 220, a storage device 225, and a modem 115. In the system 100, the buyer interface processor 205 functions as a slave processor, meaning the processor 205 is subservient to the controller processor 125. It should be understood that the remaining buyer interface components operate in the same manner as was previously described.

In one embodiment, a MICRON™ computer (available from Micron Technology, Incorporated located in Boise, Idaho) having a keyboard and touch pad (input device 230), microprocessor (processor 205), dynamic and static memory (storage device 225), and a video monitor (monitor 210) comprised the buyer interface 110. The vending device 195 (capable of accepting credit cards and/or currency), and printer 200 are well known to those skilled in the art, and therefore, are not described in detail here. Likewise, it is well known that non-commercial and commercial software (i.e. shareware, university originated, MICROSOFT EXPLORER™ Internet browser, AOL NETSCAPE NAVIGATOR™ Internet browser, etc.) and technology alike can furnish access to distributed networks, and therefore, these technologies are also not described in further detail. The monitor 210 is preferably a Touchscreen Kiosk Monitor (Model no. 035345-000 17" CRT Monitor, or LCD) manufactured by ELO TOUCHSYSTEMS™

In the buyer interface 110 of FIG. 3, the storage device 225 maintains information on users, portal configuration, and portal operation through a configuration database 235 and a maintenance database 240.

The configuration database 235 tracks users that log onto the system 100 through the buyer interface 110. The configuration database 235 retains data on users through records that include user identification strings, portal address, dates, time, and other identifiable strings that identify the user, portal, and services provided.

The maintenance database 240 maintains operating software and maintenance information. The maintenance information tracks the condition and the use of the buyer interface 110 with records that track utilization, hardware versions, software versions, print histories, and other states of the buyer interface 110. Preferably, the maintenance database 240 is accessible to the controller 105. When the controller accesses the maintenance database 240, maintenance records can be reviewed and software can be updated from a remote location. Accordingly, the system 100 preferably includes logic for downloading software updates to buyer interfaces 100 and other portal sites.

2. Operation

FIGS. 4-7 illustrate the operation of the system 100. Optional steps are represented by dashed boxes, which are not necessarily performed each time a user logs onto the system 100. Solid lines between the boxes represent the interchange of data between devices.

At step 245 the user logs onto the system 100. As shown, the logon process occurs at the buyer interface 110. It should be understood, however, that the system 100 can be accessed from other portal sites, such as, for example, a personal or handheld computer connected to the distributed network 120.

At step 250 the buyer interface 110 (as shown in FIG. 1) logs onto the controller 105. Access involves the transmission of buyer interface and user identifying data across the distributed network 120. In one embodiment, the controller 105 emulates an Internet server or web site, which allows multiple buyer interfaces 110 and other devices access to the controller 105.

At optional step 255, the controller 105 prompts the user to complete a registration process. Preferably, the registration process guides the user through one or more interactive screens that pose questions that gather user demographic and lifestyle information. Additionally, interactive screens pose questions to gather user goals. Upon obtaining the user information and upon user request, the controller creates user profiles and assigns the user to a control group based upon the user demographic and lifestyle information, user goals, and/or user profile. After being assigned to a particular control group, the user may be offered specific goods and services directed to the control group. This step occurs when a user first logs onto the system 100 though it can be updated transparently by the controller 105 or at the direction of the user.

At step 260, the controller 105 defines the user's access rights. The controller assigns an access code comprised of a string of characters. Preferably, the access code defines the user's access rights that determine the level of services and discounts offered to the user. Access rights, for example, may define the subject areas a user may access and the discounts a user can receive.

At step 265, the buyer interface 110 prompts the user to select a subject area. The user can select from any one or combination of subjects including fitness, nutrition, wellness, and prescriptions and/or other subjects of interest. The buyer interface 110 additionally allows users to elect a purchase of tangible goods.

At step 270, the user submits his or her query. The user simply enters the query through the input device 230 (as shown in FIG. 3). Additionally, a user may dictate the query using a digital device that transcribes voice to text.

At optional step 275, the buyer interface 110 formats the query. The subject and/or goods information provided at step 265 are organized and arranged for transmission to the controller 105.

At step 280 the query is submitted to the controller 105.

Figure 5:
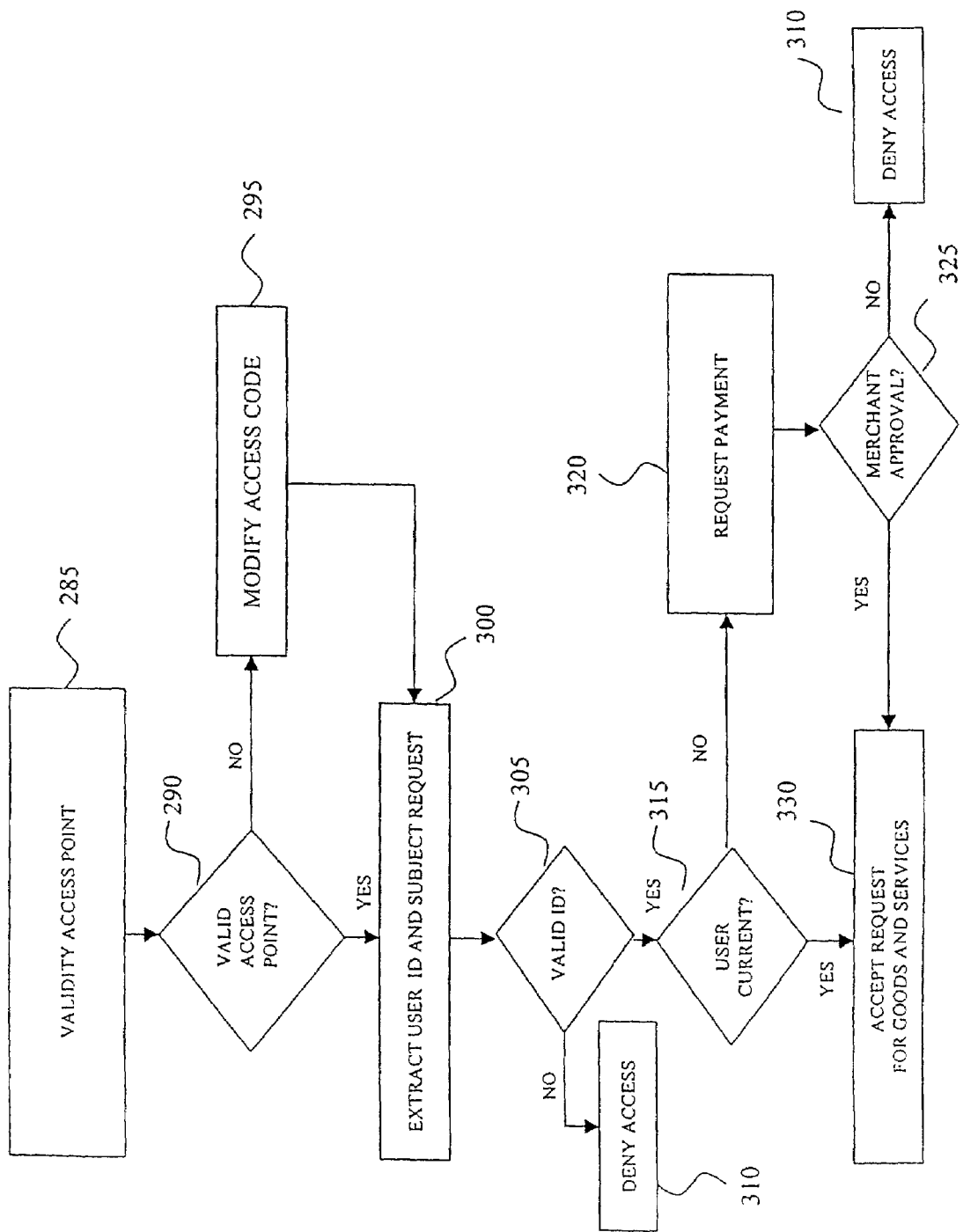
FIG. 5 is a flow-chart of a confirmation of a request for goods and/or services of FIG. 1.

As shown in FIG. 5, the controller 105 (shown in FIG. 2) initiates a user and portal validation sequence at steps 285, 290, and 295. To identify the portal, the system 100 compares the portal address or other portal identifying means to the identifying data stored in the location database 165 (shown in FIG. 2). When a match is found, the controller 105 determines that access is valid. When a match is not found the controller 105 modifies the user's access code and preferably indicates to the user that the user is accessing the system 100 from a non-sponsored portal site.

At step 300 the controller 105 extracts the user's identification string and the subject or goods request. The user's identification string authorizes access. The subject request designates the subject area to which the user wishes to subscribe. The goods request designates the goods the user wishes to purchase.

At step 305 the user's identification string is compared to user database 150 records. When the controller 105 matches the user's identity to one or more records, the user passes to step 315. When the comparison does not yield a match, access is denied at step 310.

At steps 315-320 the controller determines whether the buyer is eligible to receive information and/or goods. The controller 105 accesses the payment database 175 (shown in FIG. 2) that retains records of the user's past account activities at step 315. The user's past account activities may include purchasing an access code designating pre-authorization to receive certain information and/or goods. For example, the user may have purchased a "service package" from the sponsor or a third party representing the sponsor. The service package allows the user to receive specific services or goods from the system 100 without further payment. However, the user will still need to purchase the information and/or goods which are not part of the service package. Preferably, when an account exceeds a pre-determined balance or is delinquent, the controller 105 prompts the user to tender payment at step 320. Payment may be tendered, for example, through credit cards, electronic find transfer, debit cards, digital cash, vending systems, or other known electronic commerce methods. When the user tenders payment, merchant approval is sought at step 325. If for example, a credit or debit card is tendered, merchant approval is preferably sought from a payment authorization service that maintains a secure and reliable system for authorizing payment. When merchant approval is denied user access is denied at step 310. Alternatively, the controller 105 may access the payment controller 117 directly for the user's past account activities or to determine if the user has obtained an access code allowing pre-authorization.

At step 330 the system 100 accepts the request for goods and services.

Figure 6:
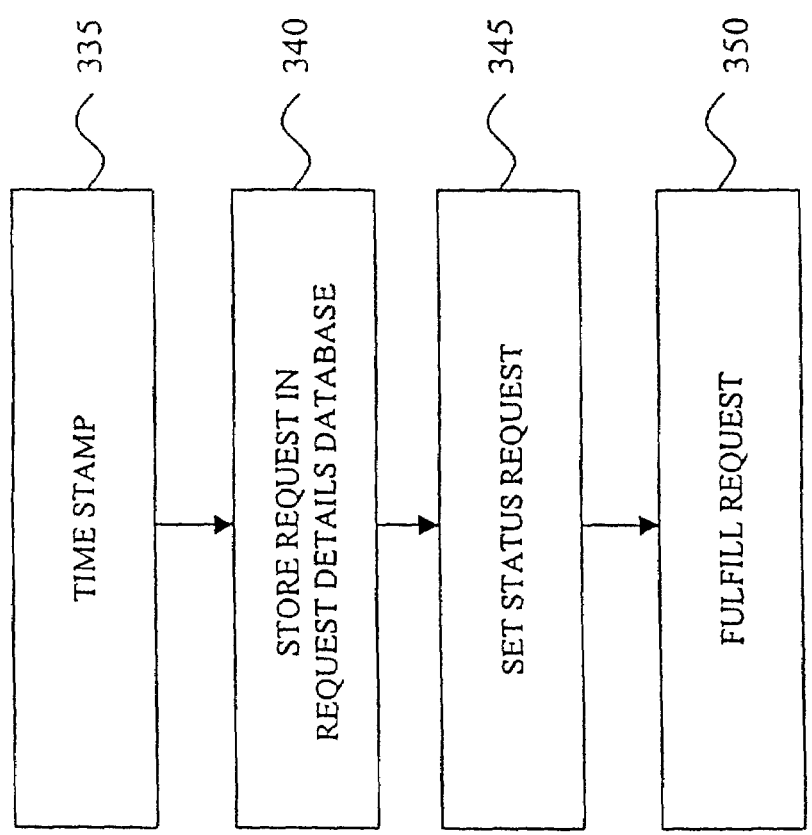
FIG. 6 is a flow chart of a request fulfillment of FIG. 1.

As shown in FIG. 6, at steps 335 and 340 the system 100 time stamps the user's request and stores the request in the request detail database 170 (shown in FIG. 2).

At step 345, the system set a status request flag. The status request flag indicates a pending request or order that has not yet been serviced.

At step 350 the subject or goods request extracted at step 300 is logged in the fulfilled databases under the appropriate subject area or order database 190 (shown in FIG. 2).

Figure 7:
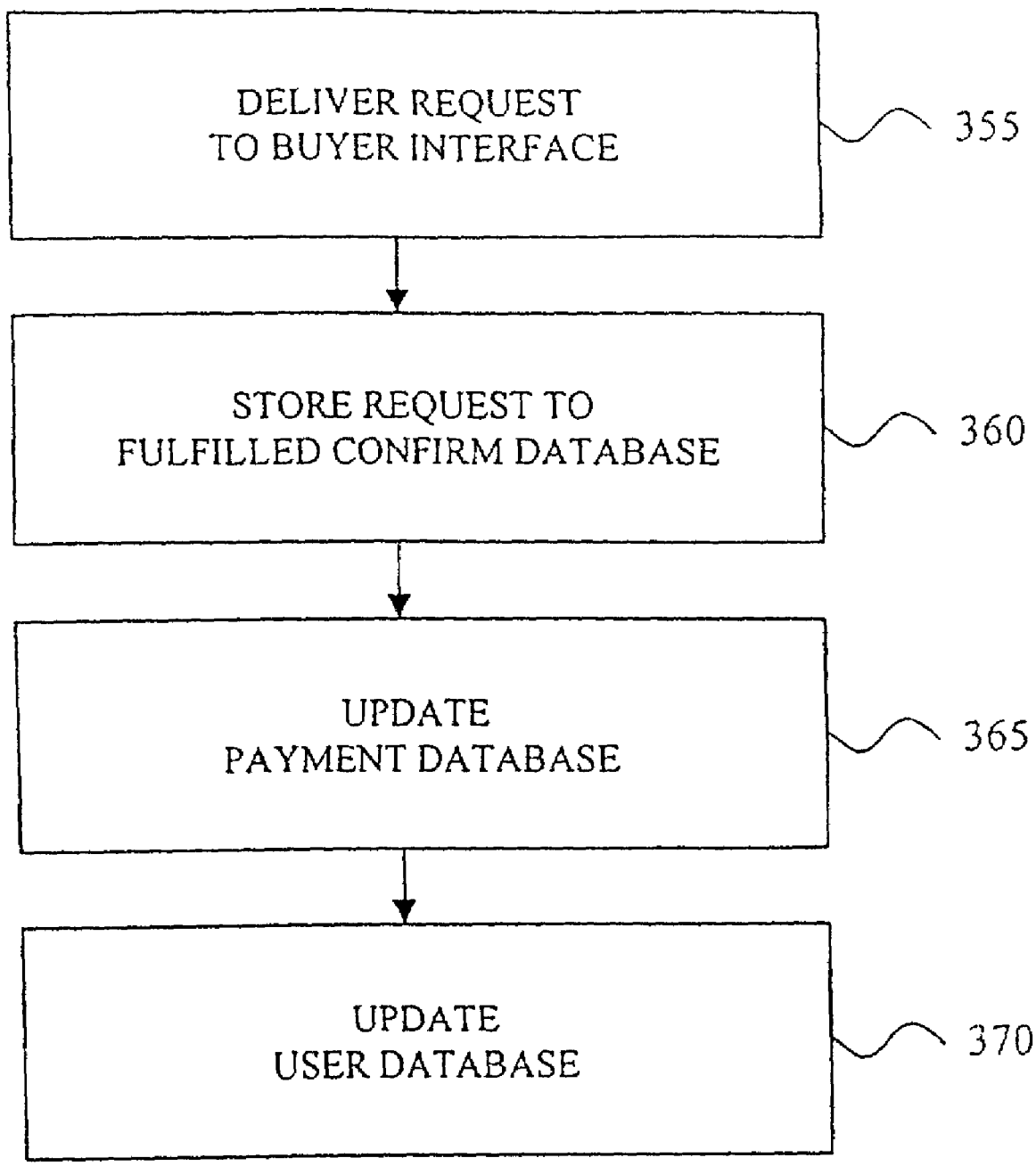
FIG. 7 is a flow chart of a delivery fulfillment of FIG. 1.

As shown in FIG. 7, at step 355, the controller 105 (shown in FIG. 2) services the subject or order request. The controller retrieves the specific services the user is seeking and delivers the requested information to the buyer interface 110. If the user is making a purchase, a purchase order and order confirmation number are delivered to the buyer interface 110. The controller 105 in turn updates the status request to indicate the request serviced is no longer pending.

At step 360, the fulfilled confirm database 160 (shown in FIG. 2) is accessed to record the date, time, and other identifiable strings that identify the user and the services and/or goods provided.

At step 365, the controller updates the payment database to reflect the user transaction.

At step 370 the transaction concludes with the controller 105 updating the user database 150.

In one embodiment of the invention, the user can request the system to offer practical guidelines and advice (i.e., a user improvement plan) to the user. The system develops the user improvement plan based upon the control group to which the user is assigned. Each control group includes a model having practical guidelines and advice, which has been developed by fitness, health and/or wellness experts.

Figure 8:
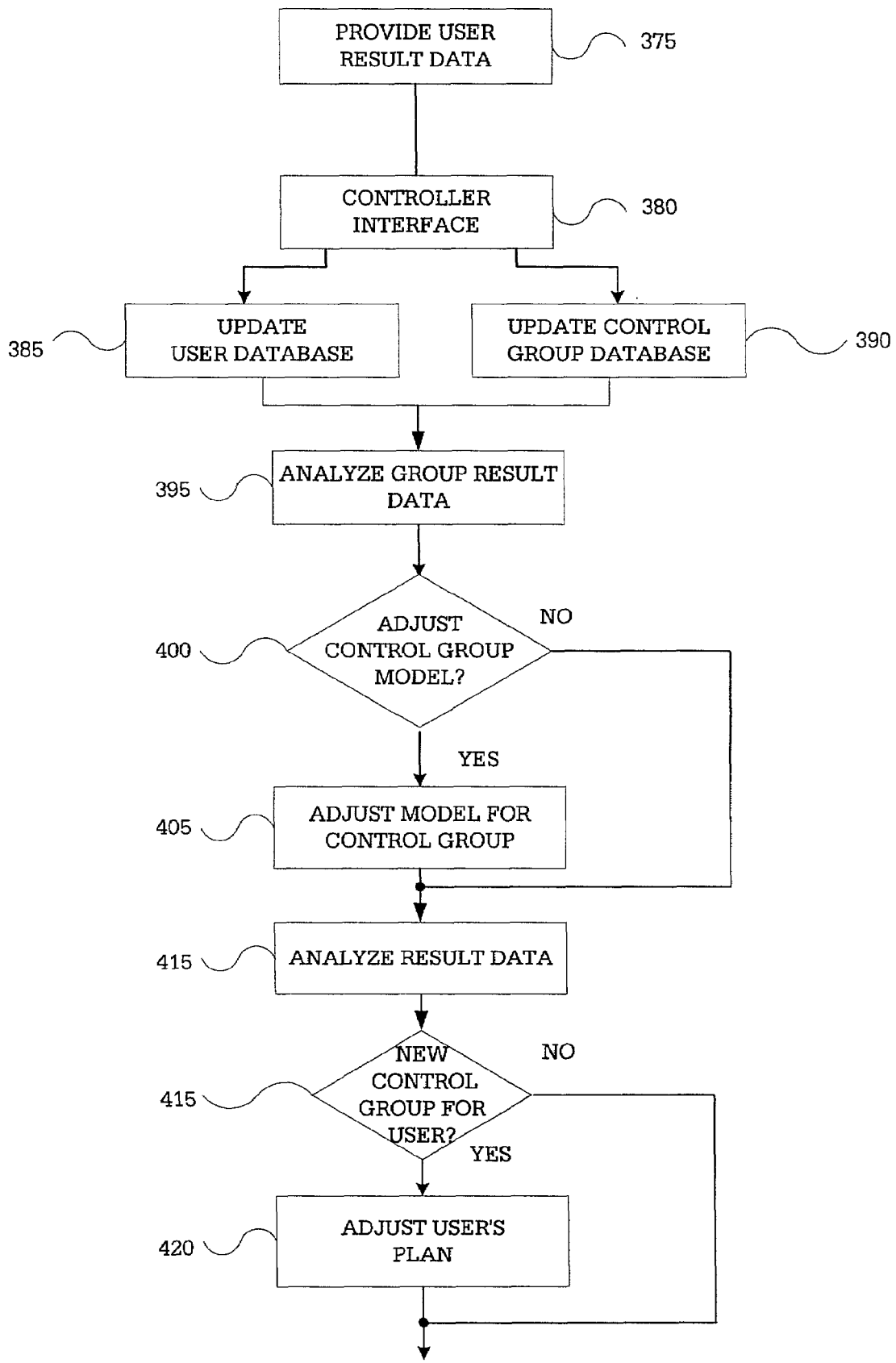
FIG. 8 is a flow chart of an update of a control group's practical guidelines and advice and update of a user's improvement plan.

As shown in FIG. 8, once the user improvement plan has been developed, the system is capable of updating the user improvement plan and/or the control group practical guidelines and advice.

At step 375, the user periodically enters result data at the portal sites. Result data includes, but is not limited to, data recorded either by the user or the system after the user performs a fitness, nutrition or wellness act.

At step 380, the result data is transmitted to the controller 105 for processing.

At steps 385 and 390, the controller 105 stores the result data within the user database 150 and within the control group database 192, respectively. The result data stored within the user database 150 is stored for each individual user and the data stored within the control group database 192 is stored for each control group.

After a period of time has elapsed, the controller, at step 395, analyzes the group result data for each control group to determine if the practical guidelines and advice are being consistently met by a large majority of users within each control group. If the practical guidelines and advice are not being consistently met, then the model relied upon by the guidelines and advice is changed, as shown in steps 400 and 405. Changing the model can either be done automatically by the controller or by the appropriate expert. If the practical guidelines and advice are being consistently met, then the controller leaves the model as is for the whole control group.

At step 410, the controller analyzes result data for each user to determine if the user has consistently met the user improvement plan. If the user improvement plan has not been consistently met, then the user improvement plan is changed, as shown in steps 415 and 420. The change of the user improvement plan can be accomplished by reassigning the user to a new control. Alternatively, if the control group model has been adjusted, then the controller adjusts the user improvement plan when the practical guidelines and advice is adjusted for the entire control group.

Therefore, the software preferably goes through two levels of validation. First, the software validates that each control group has a valid working model for the control group users, and second, the software validates each user improvement plan. If either the model or the plan has inherent errors, the system will adjust the appropriate user information plan and inform the appropriate users of the changes.

The software 1) receives the user's request; 2) validates the request; 3) accesses the relevant databases; 4) performs the necessary calculations; 5) formats the results; and 6) delivers the results to the user.

There are many types of information that can be offered to a user through such software. For example, one software module may provide personal workout information to weight trainers. In one exemplary module, a weight trainer can enter his or her workout weight and repetitions. The software directs the controller 105 to compare the weight trainer's workout to the weight trainer's goals. Based on this comparison, the software preferably suggests a weight training plan, which includes workout weight(s) and repetitions that can help the weight trainer reach his or her workout goals. This information can be provided to the weight trainer through the buyer interface 110.

In another exemplary module, upon a weight trainer's request, the software directs the controller to develop a weight-training plan (i.e., a user improvement plan) including workout weighs and repetitions for the user to perform. In this module, the processor develops the plan based upon the control group to which the weight trainer is assigned. The control group contains practical guidelines and advice for each member of the group. The practical guidelines and advice are based on a model developed by expert weight trainers. After each workout, the weight trainer enters his or her result data. The software will adjust the workout plan for the weight trainer if the weight trainer is consistently not meeting the plan. For example, the weight trainer may be either below expectations or above expectations for the plan. If the weight trainer is below expectations for the plan, the controller will make the weight training plan "easier", and similarly, if the weight-trainer is above expectations for the plan, the software will make the weight-training plan "harder". If the weight-training plan is changed because the weight trainer is reassigned to a new control group, the weight trainer will be informed of the change and may be offered a new set of goods (e.g., more exercise equipment or nutritional supplements) or a new service (e.g., a different chat room to ask questions of a different expert.)

It should be apparent that additional services could supplement the system 100. For example, the system 100 may also provide free electronic mail and chat rooms. Users might use these services to engage in on-line conversations with a diversity of fitness instructors, such as for example, personal trainers, coaches, doctors, and other users. Furthermore, the system 100 may further allow each user to update their fitness, nutrition, and wellness information residing in the user database 150 (shown in FIG. 2) over time from any location. When users update information, the system 100 retains a profile history that users can later access. Preferably, the profile histories allow vendors to market directly to users.

The foregoing detailed description describes only a few of the many forms that the present invention can take, and should therefore be taken as illustrative rather than limiting. It is only the following claims, including all equivalents, that are intended to define the scope of the invention.

What is claimed is:

1. A method of providing wellness-related services, including at least one of wellness, health, or fitness services through a publicly accessible distributed network to authorized users using authorized portals, comprising:

providing an online site that enables wellness-related databases to be accessed from at least one of a sponsored and a non-sponsored portal;

placing in communication at least one of a sponsored and non-sponsored portal to the online site through the publicly accessible distributed network wherein the publicly accessible distributed network includes the Internet, wherein the sponsored portal is at least in part sponsored by and located at, a fitness center, and wherein at least one of the non-sponsored portals accesses the on-line site through the Internet;

receiving a request at the online site requesting access to the wellness-related database;

processing the request at the online site to determine whether the portal was sponsored and whether the request was received from an authorized user;

responding to the request based in part on whether the portal was sponsored and whether the user is authorized;

wherein the method further comprises obtaining fitness-related data from the user through the sponsored portal at the fitness center, entering the fitness data for the user into the database, and providing access to the user to the fitness data through the non-sponsored portal through the Internet;

further comprising automatically assigning the user to a control group based on user attributes.

2. A method as in claim 1, further comprising providing fitness advice and goals to the control group, wherein the advice and goals are at least in part a result of the group result data.

3. A method as in claim 1, further comprising the step of creating practical guidelines and advice for the control group, and wherein the services providing step comprises providing a user improvement plan for the user, the user improvement plan is selected to be similar to the practical guidelines and advice for the control group.

4. A method as in claim 3, wherein each control group includes group result data, the method further comprising the step of:
providing result data to the portal;
storing the result data to the group result data for the authorized user's control group; and
adjusting the user improvement plan for each user in the authorized user's control group based on the stored group result data.

5. A method as in claim 3, further comprising:
storing result data for the authorized user; and
assigning the user to a new control group based on the stored result data for the user.

6. A method of providing wellness-related services, including at least one of wellness, health, or fitness services to an authorized user through a distributed communications network, comprising:
identifying a portal with a portal identifier;
storing the portal identifier associated with the portal in a database;
receiving a request from the portal by an online wellness-related site;
processing the request at a controller to determine whether the request was from the portal;
assigning an access code to the user, the access code defining a level of wellness related services available to the user;
providing the services to the user through the distributed network that corresponds to the user's access code;
providing at least one control group, wherein each control group includes at least one authorized user; and
assigning the user to one of the control groups, wherein the assigning is done automatically based on user attributes.

7. A method as in claim 6, wherein the services providing step comprises providing information or goods to the user based on the control group to which the user has been assigned.

8. A method as in claim 6, further comprising the step of creating practical workout guidelines and workout advice for the control group, wherein the services providing step comprises providing a user improvement plan for the user, and the user improvement plan is selected to be related to the practical guidelines and advice for the control group.

9. A method as in claim 8, wherein the user improvement plan is at least in part based on the collective workout related attributes of the control group.

10. A method as in claim 8, further comprising the step of providing an alarm signal to a system administrator if the user improvement plan for the users in the control group needs to be adjusted.

11. The method as in claim 8, further comprising:
storing result data for the authorized user; and
assigning the user to a new control group based on the stored result data for the user.

12. A method as in claim 6, wherein each control group includes group result data, the method further comprising the steps of:
providing the result data to the portal;
storing the result data to the group result data for the authorized user's control group; and
adjusting the user improvement plan for each user in the authorized user's control group based on the stored group result data.

* * * * *